Oct. 26, 1965  R. M. TILLMAN  3,214,741
ELECTROMAGNETIC TRANSDUCER
Filed May 17, 1960  7 Sheets-Sheet 1

INVENTOR.
ROBERT M. TILLMAN
BY James J. Wood
ATTORNEY

Oct. 26, 1965    R. M. TILLMAN    3,214,741
ELECTROMAGNETIC TRANSDUCER
Filed May 17, 1960    7 Sheets-Sheet 2

INVENTOR.
ROBERT M. TILLMAN
BY
*James J. Wood*
ATTORNEY

Oct. 26, 1965   R. M. TILLMAN   3,214,741
ELECTROMAGNETIC TRANSDUCER
Filed May 17, 1960   7 Sheets-Sheet 4

INVENTOR.
ROBERT M. TILLMAN
BY
*James J. Wood*
ATTORNEY

Oct. 26, 1965  R. M. TILLMAN  3,214,741
ELECTROMAGNETIC TRANSDUCER
Filed May 17, 1960  7 Sheets-Sheet 5

INVENTOR.
ROBERT M. TILLMAN
BY James J. Wood
ATTORNEY

Oct. 26, 1965 R. M. TILLMAN 3,214,741
ELECTROMAGNETIC TRANSDUCER
Filed May 17, 1960 7 Sheets-Sheet 7

INVENTOR.
ROBERT M. TILLMAN
BY
ATTORNEY

United States Patent Office 3,214,741
Patented Oct. 26, 1965

3,214,741
ELECTROMAGNETIC TRANSDUCER
Robert M. Tillman, Willow Grove, Pa., assignor to Burroughs Corporation, Detroit, Mich., a corporation of Michigan
Filed May 17, 1960, Ser. No. 30,057
5 Claims. (Cl. 340—174)

This invention relates to an electromagnetic transducer and more particularly to magnetic devices for performing the essential functions of a digital data processing system: logical operations, storage or delay and control.

This application is a continuation-in-part of an application of Robert M. Tillman for "Magnetic Storage Circuitry," Serial No. 818,298, filed June 5, 1959, and now abandoned, and assigned to the same assignee as the instant invention.

One feature of these magnetic devices is the inclusion of a body of magnetic material capable of assuming various states of magnetic remanence, and most usually it has a substantially rectangular hysteresis loop. This material is then capable of being magnetized to saturation in either of two directions, the respective stable states of remanence upon removal of the driving magnetomotive force (M.M.F.) being arbitrarily denominated a "1" or "P" (the positive state of residual magnetism $+B_r$) or a "0" or "N" (the negative state of residual magnetism $-B_n$). The material for such a binary storage element may be: silicon-iron, Orthonik, 4–79 permalloy (molypermalloy), supermalloy, or any of the ferrites such as MF 666 or MF 1118.

In order to obtain maximum flux density from a given applied magnetic field intensity it is the usual practice for the binary element to have the geometry of a toroidal core. From the standpoint of physical construction the core may be fashioned from magnetic material in the form of strips wound on a small bobbin of the desired geometry, the bobbin being of non-magnetic material. Alternately, the core may be of a solid material such as a ceramic ferrite.

In all digital computer data processing frequent recourse is had to these magnetic devices in order to ascertain their then state of remanence; this step or proceeding is called READING or INTERROGATING the core. Two basic approaches are utilized in reading the cores: destructive reading and non-destructive reading. In the destructive reading system for determining the state of remanence of a storage core, a magnetomotive force is applied which is capable of switching the core in a predetermined direction. If the core was previously in the same state of remanence, then there is substantially no change in flux and little or no sense or output signal is obtained—this is indicative of the fact that the core was previously saturated in the predetermined direction. However, if the core was in the other stable state of remanence there is now an appreciable change in flux, and in accordance with Lenz's law a voltage is induced to oppose the change in flux, which voltage signal may be used to indicate the state of the core. In the latter situation, the process of deriving the output or sense signal results in the memory information being destroyed, and it is then necessary to provide means to rewrite this data into the core.

The fact that the information stored in a magnetic core has been destroyed by the sensing process is wholly undesirable in most applications, since it of necessity increases the number of components required in the order of magnitude of the additional hardware required for re-write. In the addition, a more important consideration arises from the fact that during the re-write operation a noise or power supply transient may prevent the re-write from being completed, and the computer will then deliver erroneous data which will normally not be discovered until a diagnostic routine is run. This will prove disastrous in real time computation for missile, satellite and other applications of that nature.

In non-destructive sensing the broad technique consists of producing a transient disturbance in the remanent flux which is sufficient in magnitude to produce an output sense signal, but which is insufficient to change the initial state of magnetization. The prior art non-destructive sensing techniques have included such measures as utilizing unique non-toroidal device geometry; none of these teachings is of such satisfactory nature that they have proven wholly acceptable.

In accordance with one illustrative embodiment of the invention there is provided a magnetic device comprising a magnetic circuit of material which is capable of assuming stable states of magnetic remanence. A first winding is coupled to said circuit and is adapted to receive WRITE D.C. or WRITE A.C. signal pulses during the WRITING operation, and a READ signal during the READING operation, respectively. A second winding is coupled to said circuit in such manner as to substantially minimize mutual coupling with said first winding; the second winding is adapted to receive unidirectional WRITE signals during the WRITING operation and to deliver an output signal by magnetic induction during the READING operation.

The magnetic device described supra is modified to provide additional illustrative embodiments, the description of which follows.

In accordance with another illustrative embodiment in the said magnetic device, additional means are provided for producing a constant magnetic field, said means being positioned in such relation to said first winding such that the magnetic vector M thereof is aligned with the magnetic intensity vector H created by said first winding during passage of the READ current therethrough.

In accordance with another illustrative embodiment in the said magnetic device low reluctance means is positioned in proximity to said first winding in the flux path produced by passage of electrical current therethrough.

In accordance with another illustrative embodiment in the said magnetic device, the first winding comprises a number of turns wound in solenoid fashion about the said magnetic material.

In accordance with still another embodiment, in the said magnetic device, the first and second windings are orthogonal to each other, and the first winding is wound in the form of two coils of equal number of turns connected in series in opposing relation, while the second winding is wound in the form of two coils of equal number of turns connected in series in aiding relationship.

One object of the instant invention is to provide a magnetic device which may be utilized for non-destructive reading.

Another object of the instant invention is to provide a magnetic device which is simple in construction, and in which the windings used for READING AND SENSING, respectively, may be adapted for the operation of WRITING in the intelligence to be stored.

Another object of the instant invention is to provide a magnetic device having an improved signal-to-noise ratio of the output signal.

Another object of the instant invention is to provide a magnetic device such that the READ operation may be performed successfully under a wide tolerance of thermal variation.

Another object of the instant invention is to provide a memory array having word access in which a discrete bit or bits in a word may be changed without altering the remaining bit information in any manner.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Figure 1A:
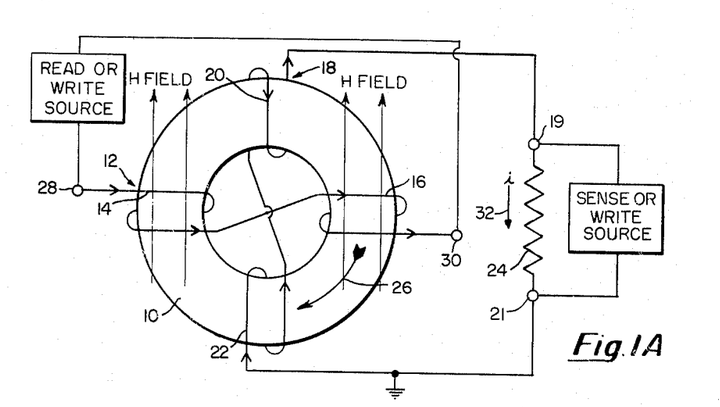
FIGS. 1A and 1B represent diagrammatically one illustrative embodiment in accordance with the invention, said embodiment being interrogated by signals of opposite polarity respectively.
Figure 1B:
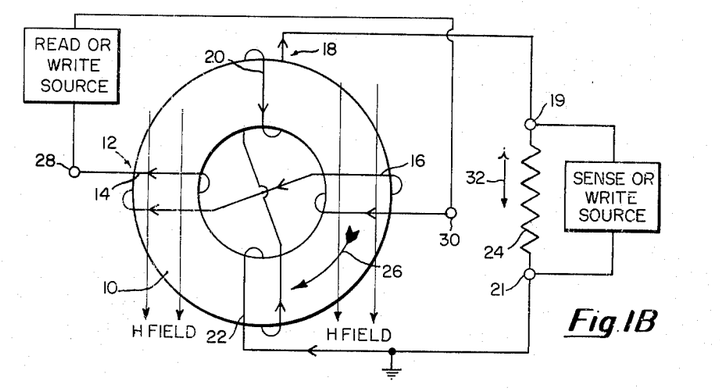

*The structure of FIGS. 1A and 1B*

Referring now to FIGS. 1A and 1B there is shown a magnetic body in the configuration of a toroidal core 10, which core is utilized as a magnetic binary element. The core may be fabricated from solid materials or from tape wound on a non-magnet spool, the only requirement being that the resultant magnetic structure provides a substantially rectangular hysteresis loop. For example the core may consist of ceramic ferrite material or of a thin ferromagnetic alloy tape wound on a non-ferromagnetic spool. A READ or INTERROGATE winding, indicated generally at 12, comprises a number of turns of wire symbolically indicated by coils 14 and 16 wound in series on the toroid 10. As will be noted from a study of FIG. 1, the coils 14 and 16 have an equal number of turns and are connected in series opposing relation to the terminals indicated at 28 and 30. A READ or WRITE source of pulse signals (unnumbered) is connected between the terminals 28 and 30, as shown. A SENSE or OUTPUT winding indicated generally at 18 comprises coils 20 and 22 wound in series aiding relation. The coils 20 and 22 have an equal number of turns and are serially connected to terminals 19 and 21, as shown; output resistor 24 is connected across terminals 19 and 21. A SENSE means or WRITE source (unnumbered) is connected in parallel with the output resistor 24.

In this embodiment and the remaining embodiments to be described, the READ and WRITE sources may be any convenient source for providing the proper D.C., A.C. or pulse signals as required. The SENSE means should be understood to be any convenient detector or amplifier means.

*Write operation (FIGS. 1A and 1B)*

We shall assume arbitrarily that a core saturated in the clockwise direction will be denominated a "1"; conversely counterclockwise saturation will be designated as a "0". In this embodiment, WRITE-IN may be accomplished by the application of a proper signal pulse to either the SENSE winding 18 alone, or by the simultaneous application of signals to both the READ and the SENSE windings 12 and 18 respectively. In the latter method—the so called coincidence WRITE-IN—the signal applied to the SENSE winding is steady D.C., or a D.C. pulse of sufficient duration, while a train of D.C. or A.C. pulse signals are applied to the READ winding. The duration of the D.C. pulses applied to the SENSE winding 18 as a minimum requirement need only occur at a time which coincides with the occurrence of the D.C. pulses or the positive and negative portions of the A.C. pulse signals applied to the READ winding 12. The theoretical explanation of the coincident WRITE-IN will be described in connection with the embodiment of FIG. 3; however, the same theoretical considerations play a role in the WRITE-IN operation utilized with all the other embodiments presently to be described.

One important advantage of coincident WRITE-IN resides in the fact that the signal (D.C. pulse or steady D.C. source) which is applied to the SENSE winding (in computer terminology this is denominated the information current) can be below the switching threshold of the cores. In utilizing the X–Y selection to write into bit location in a memory plane, it is a prerequisite that the information current be below the threshold, otherwise the current in the SENSE winding will switch all the cores which are threaded through it.

*Read operation (FIGS. 1A and 1B)*

Figure 2A:
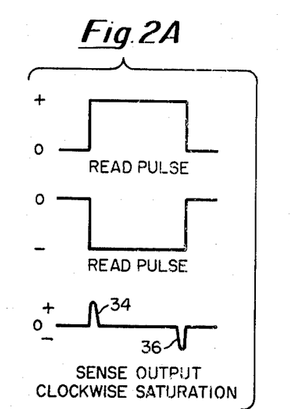
FIGS. 2A and 2B are curves used in explaining the operation of the embodiment of FIGS. 1A and 1B.

Referring now to FIGS. 1A and 2A, we shall assume that the core 10 is saturated in the clockwise direction indicated in FIGS. 1A and 1B by the arrow 26; this state is denominated a "1". If a positive going READ pulse is applied to the terminals 28, 30 of the READ or INTERROGATE winding 12, the input is substantially equivalent, in the instantaneous sense, to the application of a step input, this signal will send conventional current into the terminal 28 in the direction indicated in FIG. 1A by the arrow heads. By the application of the well known right hand rule, this current in the winding 12 will send a flux in a clockwise direction in the region of winding 14 and in a counterclockwise direction in the region of winding 16; the current in coils 14 and 16 produces a resultant magnetic field H in the direction shown in FIGS. 1A and 1B. In the region of winding 14 there is little change in the flux density since the core is substantially at saturation and the signal tends to send flux in the same direction; however, in the region of winding 16 the remanent flux is weakened, and there is a change in flux density. The flux in the region of winding 20 is also weakened, and in accordance with Lenz's law an electromotive force is induced in the winding 18 so as to send current in the direction shown by the arrow head on coils 20 and 22 so as to oppose this change. The net result is that a current pulse is sent through the resistor 24 in the direction indicated by the arrow 32. As may be seen in FIG. 2A this is a positive going pulse 34. At the termination of the READ pulse, the opposite condition prevails, and there results a negative going pulse 36 as shown in FIG. 2A.

In FIG. 1B the same toroidal core is illustrated as shown in FIG. 1A. The purpose of this showing is to depict the fact that the same SENSE output polarity is obtained whether the READ pulse is positive going or negative going. When the negative going READ pulse is applied at terminals 28, 30, this will send conventional current into terminal 30 in the direction shown by the arrow heads on coils 14 and 16. In the region of winding 16 the current will send flux in the clockwise direction, while the opposite situation will obtain in the region of winding 14. Again the demagnetizing effect in the region of winding 20 will be countered by an electromotive force which will send current in the direction shown by the arrow heads on coils 20 and 22 so as to oppose the change in flux density. Again a positive going pulse 34 is obtained, followed by a negative going pulse 36 upon the termination of the pulse.

When the core 10 is in the "0" state or counterclockwise saturation, the output (FIG. 2B) is first a negative going pulse 38 followed by a positive going pulse 40; again the SENSE output polarity is independent of the READ pulse polarity.

At the termination of the read pulse the core reverts to its initial state of saturation so that the interrogation of the memory core is non-destructive. The reasons for this reversion to the initial state are not wholly understood at this time. However, it is believed that the explanation resides in the magnetic moments resulting from electron spin and their reorientation in response to the imposition and removal of local applied fields.

Briefly, the carriers of magnetism are the fundamental particles: electrons, protons, etc. Each of these fundamental particles possess an intrinsic angular momentum called spin; associated with this spin is a magnetic moment. The magnetic moment of a fundamental particle is related to the spin through what is known as the gyromagnetic ratio. Since the ratio is an inverse function of the mass of the particle, we need only concern ourselves at this time with the magnetic moment of the electron, since its mass is two thousand times lighter than the lightest nucleus. The magnetic behavior here encountered is believed to reside in the dual effects of (a) the interaction of the moments in the presence of an external field and (b) the interaction of the moments with each other.

In the example just described when the READ pulse is applied, the demagnetization effect in the region of coil 20 exerts a torque and causes the magnetic moments of the electrons in this localized area to be rotated. The sum total effect of the rotated magnetic moments produces a local demagnetized area. The sense winding 18 then responds according to Lenz's law and produces an output voltage. When the disturbing factor, i.e., the presence of the READ pulse is removed, the magnetic moments which have rotated less than 90° readily realign themselves in the initial direction of magnetization due to other influences, such as for example, the torque exerted by preference of magnetic moments to lie along particular crystallographic directions or the preference of the magnetic moments to align themselves with the lower reluctance paths of the magnetic material as contrasted with the air paths in a toroidal geometry device. Where a discrete magnetic moment has rotated beyond 90°, the coercive effect of its spin interactions with those of other moments is sufficient to realign this subject magnetic moment.

The READ technique described herein, employing the interaction of orthogonal magnetic fields, enables READ rates to be realized which exceed 10 megacycles with no apparent core heating effects. READ may be accomplished by a single unipolar pulse of non-critical duration, amplitude and polarity. Relatively large bipolar output pulses are obtained at essentially the rate of rise of the READ pulse. The output signals have been found to be unaffected in tests at temperatures −65° C. to 125° C., and operation within substantially wider extremes appears quite reasonable.

The polarity of the output voltage (rather than the amplitude as in many core memories) indicates the state of the core. The observed output voltages follow the relationship:

$$e_{out} \sim H_{\text{read pulse}} \frac{dH_{\text{read pulse}}}{dt}$$

or since $$\frac{dH_{\text{read pulse}}}{dt}$$

is proportional to $H_{\text{read pulse}}$, when the READ pulse rise time stays the same $$e_{\text{outpeak}} \sim H^2_{\text{read pulse}} \text{ max.}$$

Where $e_{out}$ = the sense or output voltage $H_{\text{read pulse}}$ = the magnetic field resulting from the read pulse $\frac{dH_{\text{read pulse}}}{dt}$ = the derivative of the $H_{\text{read pulse}}$ with respect to time $e_{\text{outpeak}}$ = the peak of the sense or output voltage.

Figure 3A:
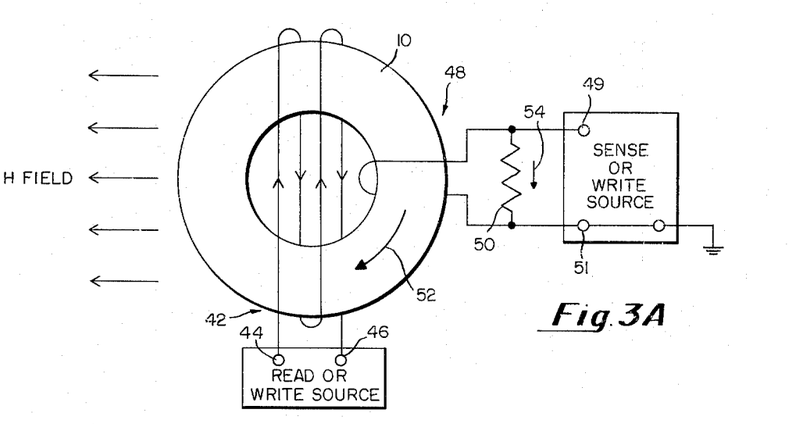
FIGS. 3A and 3B represent diagrammatically another illustrative embodiment in accordance with the invention.
Figure 3B:
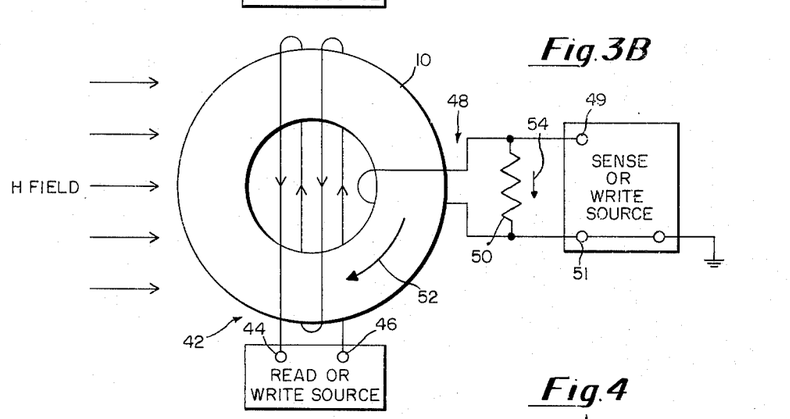

Structure of FIG. 3 (A and B)

In the embodiment shown in FIG. 3 (A and B) a single READ or SOLENOID winding indicated generally at 42 is wrapped around the entire core 10 and is connected to terminals 44 and 46 as shown; a READ or WRITE signal source (unnumbered) is connected to the terminals 44 and 46. A SENSE winding, which may be a single turn, is indicated generally at 48; this winding is arranged at right angles (orthogonal) to the general direction of the SOLENOID winding 42. Stated differently, the READ (SOLENOID) and SENSE windings are arranged so that the magnetic fields produced by currents through their respective windings have magnetic field H vectors which are at right angles to each other. The ends of the SENSE windings 48 are connected to terminals 49 and 51 as shown. A SENSE or WRITE source (unnumbered) is connected to terminals 49 and 51; a resistor 50 is connected between terminals 49 and 51 as shown.

Read operation of FIGS. 3A and 3B

If a clockwise saturation is assumed as indicated by the arrows 52 in FIGS. 3A and 3B, the current through output resistor 50 will be in the direction indicated by the arrow 54. The SENSE output will have the voltage waveform indicated in FIG. 2A regardless of the polarity of the READ pulse signal. For example in FIG. 3A arbitrarily, by definition when a positive going pulse is applied to the input terminals 44, 46 it has the direction indicated by the arrow heads, on READ winding 42, while conversely, when a negative going pulse is applied to terminals 44, 46 has the direction indicated by the arrow heads on READ winding 42 in FIG. 3B. The output pulse polarity is the same in both cases, because by Lenz law an opposing E.M.F. is set up to restore the flux. In both instances the remanent flux is in the clockwise direction, and hence the counter E.M.F.'s will be in the same direction. The magnetic field vector H resulting from the current through the SOLENOID winding 42 is indicated by the arrows as shown to the left of FIGS. 3A and 3B respectively.

Write operation

The write operation will now be described in connection with FIGS. 4, 5A and 5B, although it will of course be understood that the same theoretical explanation applies to writing into the configuration shown in FIGS. 1A and 1B, as well as all the additional embodiments.

Figure 4:
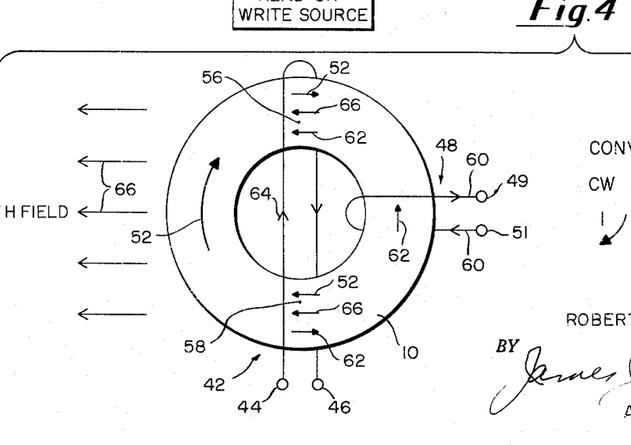
FIG. 4 is a diagrammatic showing of one storage condition of the illustrative embodiment of FIGS. 3A and 3B, which showing is used in the explanation of the writing operation.

Assume that the core 10 shown in FIG. 4 is in the "1" state, i.e., clockwise saturation as indicated by the arrow 52, and that it is desired to write a "0," i.e., place the core 10 in counterclockwise saturation. A steady D.C. current or a D.C. pulse of sufficient time duration is applied to the winding 48 in the direction shown by the arrows 60; this current signal will tend to drive the core in counterclockwise direction 62. As previously stated the duration of the D.C. pulse applied to the SENSE winding 48 as a minimum requirement need only occur at a time which coincides with the occurrence of the D.C.

pulses or the positive and negative portions of the A.C. pulse signals applied to the READ winding 42. However, the magnetomotive force (M.M.F.) developed is below threshold and is insufficient of itself to drive the core to the "0" remanent state; in the illustrative embodiment here described the threshold M.M.F. was 450 milliampere turns.

A burst of either D.C. pulses or A.C. pulses is applied at the input terminals 44, 46 of SOLENOID winding 42. In the interest of simplicity, the SOLENOID winding is here illustrated symbolically as having a single turn. Let us assume that the pulses are D.C. pulses and the current is in the direction shown by the arrows 64; this current creates a magnetic "H" field in the directioin indicated by arrows 66.

Figure 5A:
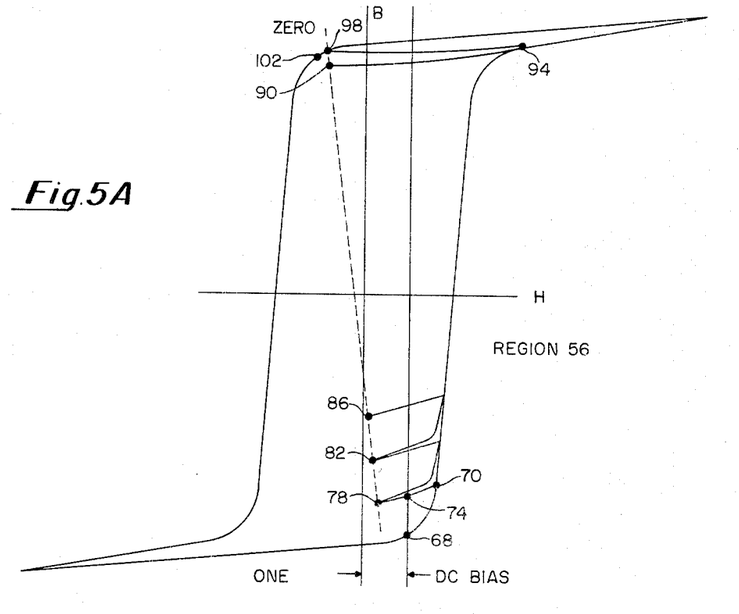
FIGS. 5A and 5B are hysteresis loops utilized in conjunction with FIG. 4 in explanation of the writing operation.
Figure 5B:
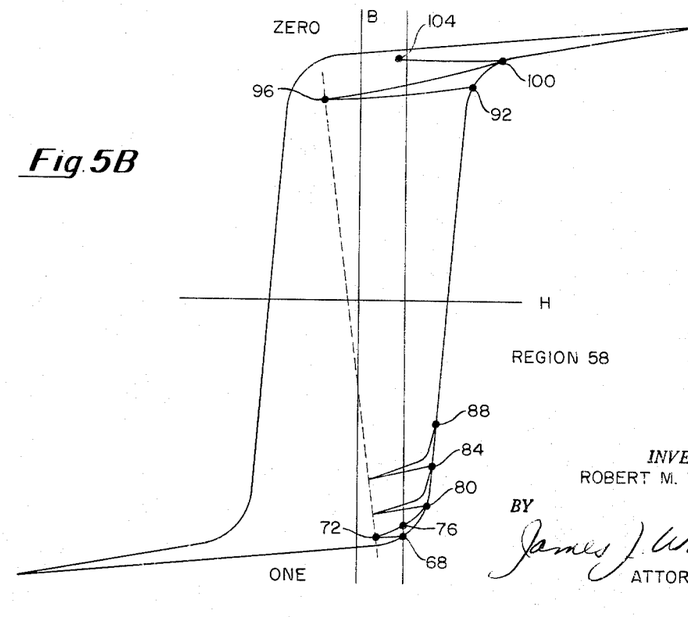

In FIGS. 5A and 5B, there are shown hysteresis loops for the core material directly under the SOLENOID winding 42 in the regions indicated at 56 and 58 respectively.

The current applied at the SENSE winding 48 effectively applies a D.C. bias to the core, so that in terms of the hysteresis loops, the operating point is shifted to point 68. As the first pulse is applied, the region 56 is driven to point 70 (FIG. 5A) while the region 58 is driven to point 72 (FIG. 5B). As will be presently indicated this is an unstable condition, and hence, is transitory.

It should be observed in FIG. 4 that in the region 56 the H fields set up by the SENSE and SOLENOID windings 48 and 42, respectively, are in the same direction, while in the region 58 they are bucking, i.e., compare vectors 62 and 66. There is thus a slight demagnetizing effect in the region 58. Accordingly, the magnetomotive force of the SOLENOID winding drives the core materials in the regions 56 and 58 temporarily in opposite directions.

The states of the core are at points 70 and 72 during the pulse. When the pulse is over, the state of the core drops back to 74 and 76 respectively. As commented upon supra, the respective magnetic conditions of regions 56 and 58 (upon termination of the first pulse), indicated at 74 and 76 are temporary and unreal for two reasons: (a) the flux density B at points 74 and 76 are unequal and (b) the energy equation states that the magnetic energies within the material will seek minimum energy conditions. This condition is changed as the region 56 moves from point 74 to 78 and the region 58 moves from 76 to 80. It should be observed that $$B_{78}=B_{80}$$

As the pulse signal burst applied to the SOLENOID winding continues and the quiescent points proceed in increments toward "0" remanence. For this reason this type of writing operation has been denominated "RATCHET writing." The term "ratchet" may be associated with the type of pulse applied to the solenoid winding, during either a write or an interrogate operation. It is defined hereinafter. Thus $$B_{78}=B_{80}$$
$$B_{82}=B_{84}$$
$$B_{86}=B_{88}, \text{etc.}$$

Ultimately the core regions approach "0" remanence. For example, when the region 56 is at 90, the region 58 is at 92. The last D.C. pulse applied at SOLENOID winding 42 drives the region 56 to the position 94 while region 58 is driven to 96. Again the condition is transitory and stability is achieved when the region 56 reverts to point 98 and the region 58 reverts to point 100. The train of WRITE signal pulses has now been terminated. Now the steady direct current or the D.C. pulses applied to winding 48 terminates, and the regions 56 and 58 move along a nearly major hysteresis loop to points 102 and 104 respectively. The magnetic states indicated symbolically by points 102 and 104 result from the permanent magnetic effect produced by the SOLENOID winding 42 (i.e., point 102 is as far to the left of the ordinate axis as point 104 is to the right thereof). In practice these deviations from the ideal remanent points can be ignored. The core is now effectively in "0" remanence.

The WRITING action has been described by reference to hysteresis action which is taking place in regions 56 and 58. The reason for selecting these regions resides in the fact that the most radical changes are felt here. It should of course be understood that similar actions are also taking place simultaneously in less degree throughout the rest of the core so that upon completion the core is at "0" remanence.

In one practical example the D.C. pulse applied to the SENSE winding 48 had a time width of 30 $\mu$sec. and an amplitude of 175 ma. The SOLENOID pulses had a time width of .7 $\mu$sec. and an amplitude of 1.5 amp. in a four-turn SOLENOID; in the order of 15 pulses were required to step the core from one remanent state to the next.

It has been determined by experiment that neither the rate of rise of the WRITE pulse nor the width (time duration) of each WRITE pulse effects the number of pulses required to switch the core from one state of remanence to the opposite state of remanence. However, an increase in WRITE pulse amplitude proportionally decreases the required number of pulses necessary to reverse the state of the core. The converse is also true—the lower the amplitude of the WRITE pulse current signals, the more pulses are required.

Figure 6:
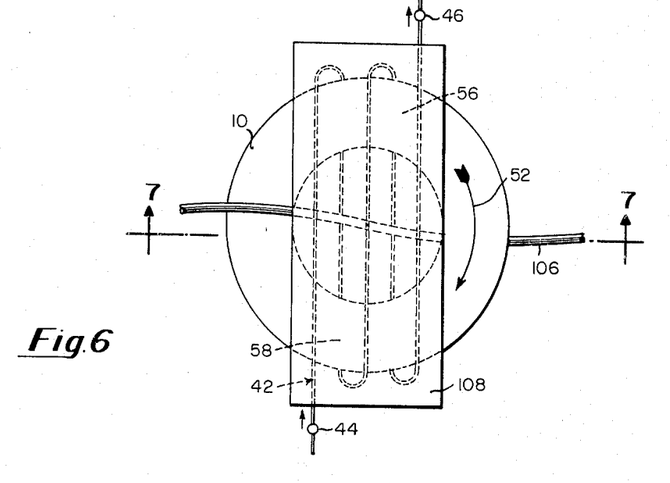
FIG. 6 represents diagrammatically another illustrative embodiment in accordance with the invention.
Figure 7:
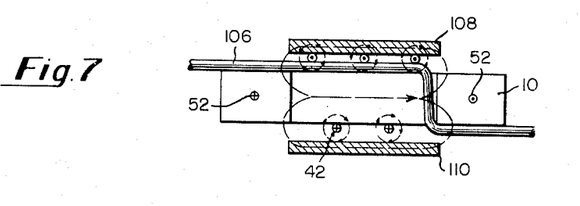
FIG. 7 is a view taken along the line 7—7 of FIG. 6.

Another illustrative embodiment of the non-destructive technique in accordance with this invention is depicted in FIGS. 6 and 7. A SENSE or OUTPUT winding indicated generally at 106 comprising at least one turn is first threaded through the core 10 in an over and under fashion. A READ or SOLENOID winding, indicated generally at 42, is wound transverse of the core 10 orthogonal to the SENSE or output winding 106. The SOLENOID winding 42 is connected to terminals 44, 46 as shown so that depending upon the direction of the current applied at these terminals, one of the regions 56 or 58 will be locally demagnetized. On one or both sides of the core 10, pieces of low reluctance material 108, 110 may be positioned in any convenient manner closely adjacent to the core and windings as shown.

Assume that the core 10 is in a state of clockwise saturation as indicated by the arrow 52. The application of a READ pulse, either positive going or negative going, will produce the SENSE wave output shown in FIG. 2A. Conversely, when the core is in a state of counterclockwise saturation, the application of a positive or negative going pulse will produce the SENSE wave output shown in FIG. 2B.

Another theoretical explanation is offered to explain this phenomena. Assume that the core is in a state of clockwise saturation indicated at 52, and that an INTERROGATE or READ pulse is applied to terminals 44, 46 so that current is entering terminal 44 and leaving terminal 46.

Figures 8A, 8B, 14:
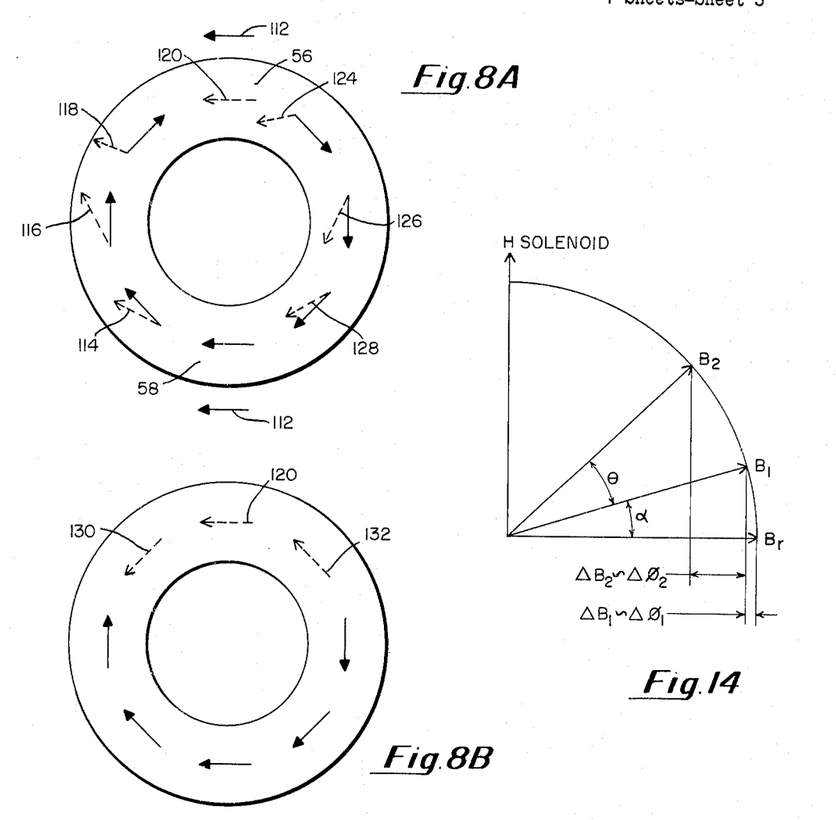
FIGS. 8A, 8B and 8C are diagrams used to explain the theoretical operation of the magnetic memory device of this invention.
FIGS. 13 and 14 are diagrammatic showings used in explaining the operation of the embodiment of FIG. 12.

Referring now to FIG. 8A, in the hypothetical case under consideration, the current through the READ winding 42 creates a magnetic field H in the direction indicated by the arrows 112. The net result is to produce little change in the flux density in region 58 and a larger change in the decreasing direction in region 56. The solid black arrows symbolize the residual state of magnetization, while the dotted arrows indicate symbolically the rotation of the magnetic moments of the electron. As we proceed clockwise from the region 58 we observe that the magnetic moments are progressively rotated a greater and greater angular displacement as represented by vectors 114, 116 and 118. It should be noted that the magnetic moment 118 has been displaced through an angle greater than 90°, and somewhat less than 180. In this region 56 resultant magnetic moment 120 is reversed. As we proceed clockwise similar displacements are indicated symbolically by vectors 124, 126 and 128.

When the READ pulse is removed, most of the magnetic moment vectors are rotated back to their initial positions; however, as shown in FIG. 8B some of the magnetic moments are temporarily reversed as indicated by vectors 120, 130 and 132. The reason for this reversal stems from the fact that they have been displaced through an angle greater than 90°, and upon removal of the external magnetic field it is much easier to rotate through the acute angle in the reverse direction or remain where they are as in the case of vector 120.

Figure 8C:
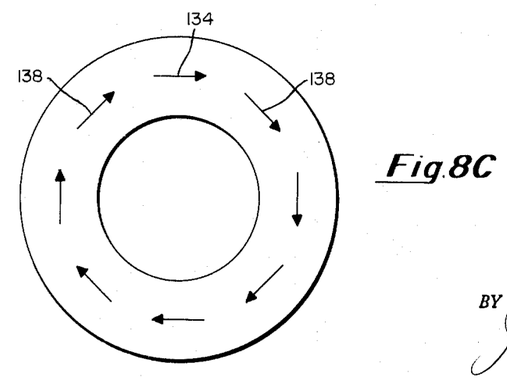

However this displacement is temporary and the presence of the majority of magnetic moments vectors aligned in the clockwise direction, caused these vectors 120, 130 and 132 to be realigned in the clockwise direction as indicated at 134, 136 and 138 respectively as shown in FIG. 8C.

The embodiment of FIGS. 6 and 7 may be utilized without the low reluctance material 108, 110. However, with the utilization of these materials in cooperation with the existing structure, a larger output pulse magnitude is produced in the order of two and one-half. The reason for the greater output signal arises from the fact that a greater demagnetization flux is produced with the low reluctance material included as part of the structure. As is well known $$\phi = \frac{M.M.F}{R}$$

where $\phi$ = the flux $M.M.F.$ = the magnetomotive force $R$ = the reluctance

Without the materials 108, 110 included in the structure $$\phi_1 = \frac{M.M.F}{R_1}$$

where $R_1$ = the reluctance of the flux path mostly through air.

When the materials 108 and 110 are included $$\phi_2 = \frac{M.M.F.}{R_2}$$

$R_2$ = the reluctance of the path which includes 108, 110.

Since $R_2 < R_1$, therefore the same M.M.F., $\phi_2 > \phi_1$.

As may be seen in FIG. 7, since this is a demagnetizing flux, a greater electromotive force must be generated to produce a greater flux to oppose this change.

Figure 9:
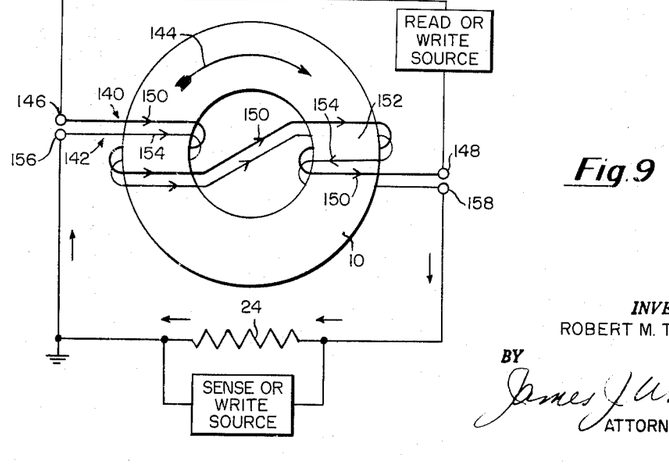
FIG. 9 represents diagrammatically another illustrative embodiment of a magnetic memory device in accordance with the invention.

In the FIG. 9 embodiment, the READ or INTERROGATE winding is indicated generally at 140, and the SENSE or OUTPUT winding is indicated generally at 142. The READ and SENSE windings 140, 142, respectively, comprise coils which are equal in number of turns, i.e., winding 140 comprises two coils having equal number of turns and likewise winding 142 comprises two coils having equal number of turns. The SENSE winding 142 is not arranged orthogonal to the READ winding in this embodiment; instead these windings are arranged in close proximity on the core 10, but the winding directions are carefully selected so that the direction of the currents in the two halves of the SENSE winding 142 are equal and opposite so that mutual coupling effects, resulting from the flux associated with winding 140, are neutralized or reduced to a negligible factor. The SENSE winding 142 is connected to terminals 156 and 158 as shown.

Figure 2B:
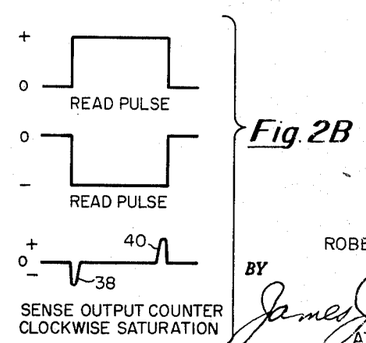

The operation of the embodiment of FIG. 9 is similar to that of the other embodiments previously described. Assume that the core is in a clockwise state of saturation as indicated by the arrow 144 on the core. When a READ pulse is applied to terminals 146, 148 of such polarity as to send current in the direction indicated by the arrow 150, a current is induced in the SENSE winding 142 in the region 152 of the core 10 in a direction shown by the arrows 154. The output wave patterns for positive and negative READ pulses are shown in FIGS. 2A and 2B.

Figure 10:
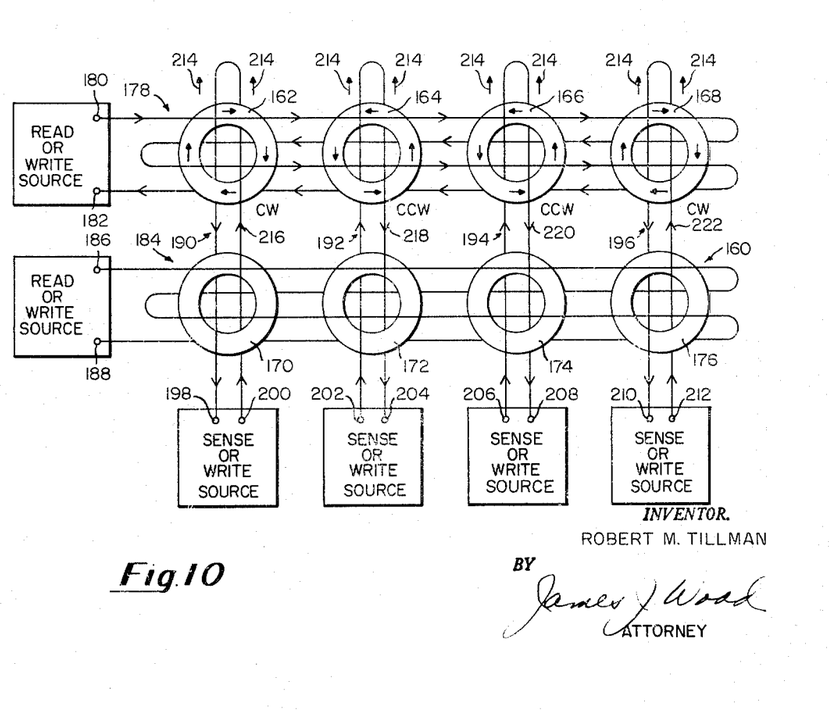
FIG. 10 is an array of magnetic memory devices in accordance with the principles of the invention.
Figure 11:
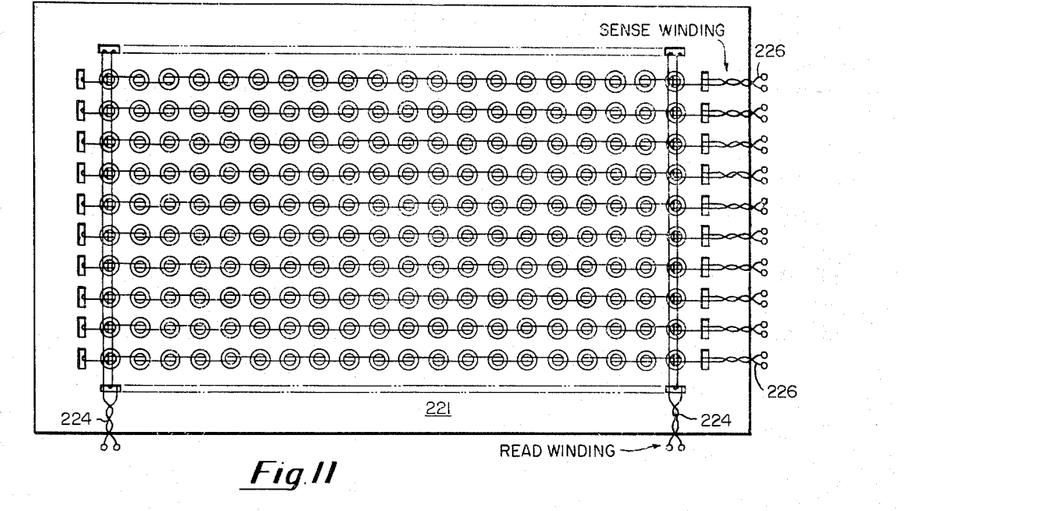
FIG. 11 is an illustrative embodiment of how the principles of this invention may be utilized to provide a magnetic memory array for storing and reading out a plurality of words, each word having a plurality of bits.

A memory unit of 20 words of 10 bits each utilizing the principles of this invention is depicted in FIG. 11. In order to make clear the operation of this memory, in FIG. 10 there is illustrated a memory indicated generally at 160 comprising two words of four bits each.

A bit is defined as the smallest unit of information. It may be a binary digit "1" or "0" or it may be a "yes" or a "no." The word is defined as a number of bits, and in the language of digital computers we may have a four-bit word, a ten-bit word, etc. The word is usually stored and transferred as a unit. The word is treated by the control unit of a digital computer as an instruction and by the arithmetic unit as a quantity.

In FIG. 10 the bits are stored in cores 162, 164, 166, 168, 170, 172, 174, 176. The cores 162–168 constitute one word, while the cores 170–176 constitute another word. The READ or INTERROGATE winding indicated generally at 178 is wound transversely around all the cores 162–168 as shown, and terminates at terminal posts 180, 182. Similarly READ or INTERROGATE winding 184 is wound around cores 170–176, and terminates at terminal posts 186, 188, SENSE or OUTPUT windings 190, 192, 194, 196 are wound through a successive column of cores as shown, said windings terminating in terminal posts 198, 200, 202, 204, 206, 208 210, 212, respectively.

Arbitrarily, let clockwise saturation of a core be a "1" and counterclockwise saturation be a "0." Assume that the word of four bits (cores 162, 164, 166, 168) is in the state of saturation as shown by the arrows. The cores then have these values:

Core 162—1
Core 164—0
Core 166—0
Core 168—1

The word is then 1001. It is now desired to determine what the word is without destroying or erasing the memory. An INTERROGATING pulse is applied at the proper time to terminals 180, 182 so as to send current in the direction shown; this current creates a magnetic field in the direction shown by the arrows 214. As previously described this field causes rotation of the magnetic moments and the SENSE winding develops a voltage which sends current in the direction to oppose the change; this direction of conventional current in the sense winding is shown by the arrows 216, 218, 220, 222, respectively. The resulting output at the sense terminals 198, 200; 202, 204; 206, 208; and 210, 212, is detected by any suitable means which then translates this output into the binary notation 1001. Upon removal of the READ pulse the magnetic moments of the electrons are rotated into initial position, and the cores retain the stored information 1001 respectively.

A more practical embodiment of a memory using the technique just described is shown in FIG. 11. The cores are cemented into holes pre-drilled in a flat phenolic card 221. Two READ or INTERROGATE windings 224 and all the SENSE windings 226 are shown. The memory shown in FIG. 11 comprises 20 words each word having 10 bits.

As one may observe from a study of FIGS. 10 and 11, these embodiments provide word access memory means having the advantage that one or more bits may be changed, as required, without the necessity of disturbing the remaining information. In the example used in explaining the operation of FIG. 10, if it is desired to change the information to 1000, approximate write signals are applied at terminals 180, 182 and 210, 212 thereby changing the information in core 168 to "ZERO" (CCW saturation).

The signal output from the memory unit shown in FIG. 11 may be enhanced by using the technique described in connection with the embodiment of FIGS. 6 and 7; thus by arranging low reluctance materials in spaced relationship on both sides of the READ or SOLENOID, the SENSE or output signal may be increased in the order of two and one-half times greater.

Figure 12:
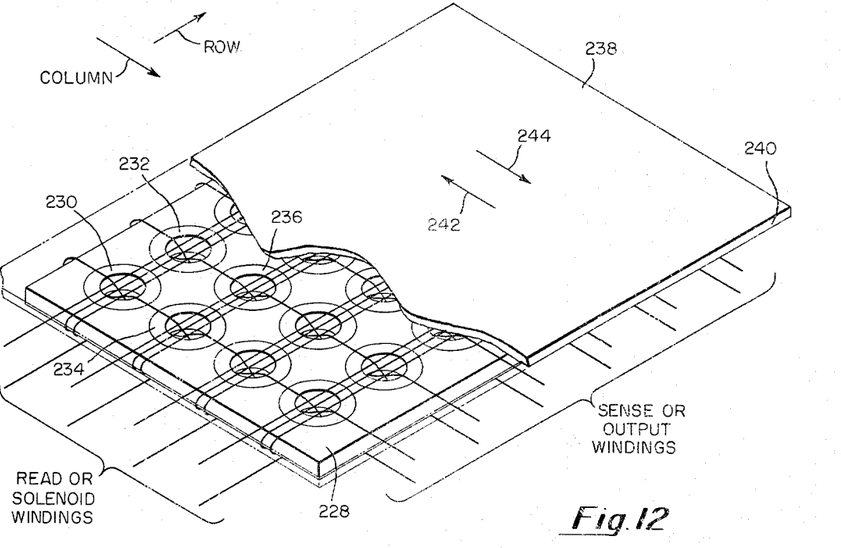
FIG. 12 is an isometric view, partially in section, of another illustrative embodiment of the invention.
Figure 13:
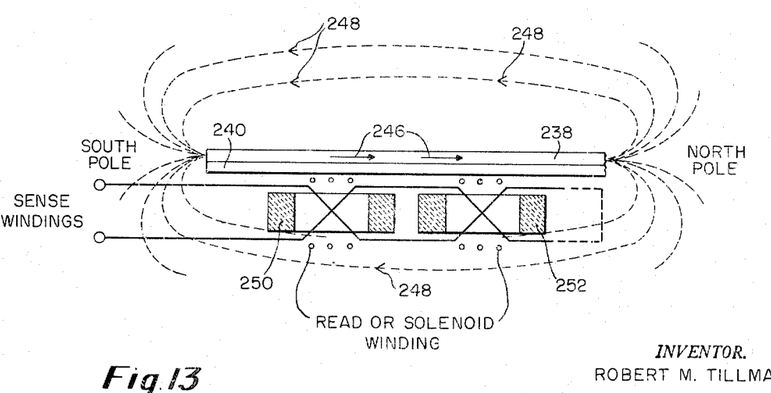

Another embodiment for obtaining enhanced signal-to-noise ratio by means of a magnetic biasing technique is disclosed in FIGS. 12 and 13. Referring now to FIG. 12 as in the arrangement of FIGS. 10 and 11, the cores are cemented into holes pre-drilled in a flat phenolic card 228. The READ or SOLENOID windings and the SENSE or OUTPUT windings (unnumbered) are indicated in FIG. 12. Thus 230, 232, etc., are a part of a row of cores, and 230, 234, etc. are part of a column of cores.

The biasing magnetic field may be produced by several means. In the embodiment of FIGS. 12 and 13 a thin film in the order of 5 mils of high coercive nickel cobalt material, indicated at 238, is deposited on a copper coated substrate 240 such as a printed circuit board.

The thin film 238 of high coercive nickel cobalt is deposited electrochemically. Later it is magnetized in a high field (about 7,000 gauss) in the desired planar direction and retains this magnetism (under the presence of pulse fields from the SOLENOID winding in the order of 30 to 50 gauss) because of its high coercive value (200–300 oersteds). The resulting material 238 develops a magnetization M vector in the direction of the orienting field.

Any magnetic material, deposited or in rolled sheet or cast form, or otherwise formed, may be utilized if it is in the proper or desired shape, and is of high enough coercive property to withstand the SOLENOID pulse fields without the loss of magnetism; this includes such materials as the impregnated rubber magnetic material "PLASTIFORM," plastic-rubber magnetic sheet material, and VICALLOY metallic sheets.

The direction of the magnetization M (vector) produced in the thin film 238 is in the plane of the thin film, and aligned with the direction of the magnetic field H produced by the READ or SOLENOID winding; in the partial sectional view shown in FIG. 12, this H field direction may be in either the directions indicated by the arrows, 242, 244. Thus when the thin field and substrate combination 238, 240 is positioned over an array of cores, the READ or SOLENOID windings must therefore receive current in such direction as will produce an H field in the same direction as the M vector.

The operation of the device of FIG. 12 may be best understood by reference to the schematic cross-sectional view shown in FIG. 13 together with the diagram of FIG. 14. The direction of the magnetization M in the thin film 238 is indicated by the arrow 246; this results in flux in the direction indicated by the arrow heads 248. In effect the thin film acts as a permanent magnet with north and south poles as indicated in FIG. 13. Cores, such as are used in all previous embodiments, are indicated at 250 and 252. With this D.C biasing technique shown in FIGS. 12 and 13 the resulting voltage output is increased five fold over the configuration shown in FIGS. 1A, 1B and 3A, 3B and may be expressed mathematically as:

$$e_{out} \sim H_{D.C.\ magnet} + H_{read\ pulse} \frac{dH_{read\ pulse}}{dt}$$

Where $e_{out}$ = the sense or output voltage $H_{D.C.\ magnet}$ = the magnetic field, proportional to M, resulting from the biasing magnet $H_{read\ pulse}$ = the magnetic field resulting from the READ pulse and $\frac{dH_{read\ pulse}}{dt}$ = the derivative with respect to time of the $H_{read\ pulse}$.

Another explanation of the reason for the increase in output voltage ($e_{out}$) may be had from a study of FIG. 14. The ordinate $H_{solenoid}$ is the magnetic field resulting from READ current applied to the READ or SOLENOID winding. The abscissa $B_r$ is the remanent magnetic flux density vector in a core in the region where greatest change will be experienced (elsewhere throughout the cross-sectional area of a core, the $B_r$ vector will be differently oriented with respect to $H_{solenoid}$). The magnetization M of the thin film 238 rotates the remanent vector $B_r$ through an angle α to the vector position indicated by $B_1$; this results in a change in flux density of $$B_r - B_1 \cos \alpha = \Delta B_1$$

The application of the READ current to the SOLENOID winding rotates the $B_1$ vector through the angle θ to the vector position $B_2$. The change in flux is now:

$$B_1 \cos \alpha - B_2 \cos (\alpha + \theta) = \Delta B_2$$

The $\Delta B_1$ change in flux density produces a change in flux $\Delta\phi_1$; similarly the $\Delta B_2$ change in flux density produces a larger change in flux $\Delta\phi_2$. The voltage output signal is of course proportional to the change in flux $\Delta\phi$. Thus the change in flux density ($\Delta B$) increases. Compare the magnitude of $\Delta B_2$ with $\Delta B_1$.

The biasing magnetic field may be produced in any convenient manner:

(a) By means of a permanent magnet such as a bar magnet;

(b) By means of an electromagnet;

(c) By means of a D.C. current applied to the READ or SOLENOID winding;

(d) By means of a thin film of permanently magnetized high coercive material such as nickel cobalt or the like, as illustrated in FIGS. 12 and 13; and (e) By means of a solid sheet of permanently magnetized high coercive magnetic material.

Regarding the technique of item (c) supra, it is apparent that if a source of steady D.C. current, suitably decoupled from the READ or WRITE source (so as not to load this latter source) is applied to the SOLENOID windings, a bias field will be set up that produces flux in the same desired direction as that of the permanently magnetized material.

In summary the READ and WRITING techniques described in connection with FIGS. 1A, 1B; and 3A, 3B; are also used in the embodiments of FIGS. 6, 7; FIG. 9; FIGS. 10, 11; and FIGS. 12, 13.

A "ratchet" pulse as used herein may be of either polarity and may include a unidirectional or D.C. pulse, or it may include a pulse which is part of a sequence of pulse doublets such as generated by an A.C. wave consistent with the description herein presented.

Obviously many modifications and variations of the present invention are possible in the light of the above teachings. It is therefore to be understood that within the scope of the appended claims the invention may be practiced other than as specifically described and illustrated.

What is claimed is:

1. In a magnetic device comprising a magnetic circuit of material which is capable of assuming stable states of magnetic remanence, first winding means coupled to said circuit, first signal means connected to first winding means for delivering a plurality of ratchet write signal pulses during the writing operation and a read signal comprising at least one ratchet pulse during the read operation, second winding means coupled to said circuit in such manner as to substantially minimize mutual coupling with said first winding means, second signal means connected to said second winding means for delivering a unidirectional information signal during the writing operation, the magnitude of said information signal being insufficient in the absence of said ratchet write signals to cause said circuit to assume a stable state of opposite polarity, said second winding means developing an output signal by magnetic induction during the reading operation, the improvement wherein said first winding means includes a winding which is wound completely around said magnetic circuit taken as a body in solenoidal fashion, thereby providing manufacturing simplicity and effective electrical operation.

2. In a magnetic device comprising a toroidal core of material which is capable of assuming stable states of magnetic remanence, first winding means coupled to said core, first signal means connected to first winding means for delivering a plurality of ratchet write signal pulses during the writing operation, second winding means coupled to said core in orthogonal relationship with respect to said first winding means, second signal means connected to said second winding means for delivering a unidirectional information signal of a selected polarity during the writing operation, the magnitude of said information signal being insufficient in the absence of said ratchet write signals to cause said core to assume a stable state of opposite polarity, the improvement wherein said first winding means includes a winding which is wound as a solenoid completely around said toroidal core in non-interlinking fashion, thereby providing manufacturing simplicity and effective electrical operation.

3. In a magnetic device comprising a toroidal core of material which is capable of assuming stable states of magnetic remanence, first winding means coupled to said core, first signal means connected to first winding means for delivering a non-destructive read signal comprising at least one ratchet pulse during the read operation, second winding means coupled to said core in orthogonal relationship with respect to said first winding means, output means connected to said second winding means for receiving an output signal developed by magnetic induction during the reading operation, said output signal having a polarity representative of the existing state of magnetic remanence of said core, the improvement wherein said first winding means includes a winding which is wound as a solenoid completely around said toroidal core in non-interlinking fashion, thereby providing manufacturing simplicity and effective electrical operation.

4. In a magnetic device comprising a toroidal core of material which is capable of assuming stable states of magnetic remanence, said core having a substantially rectangular hysteresis characteristic, write and read winding means consisting of a first and a second winding coupled to said core, said first and second windings being in orthogonal relationship with respect to one another, said second winding being threaded through the aperture of said core, first signal means connected to said first winding for delivering a plurality of ratchet write signal pulses during the writing operation and a read signal comprising at least one non-destructive ratchet pulse during the read operation, second signal means connected to said second winding for delivering a unidirectional information signal during the writing operation, the magnitude of said information signal being insufficient in the absence of said ratchet write signals to cause said circuit to assume a stable state of opposite polarity, said second winding developing an output signal by magnetic induction during the reading operation, said output signal having a polarity representative of the existing state of magnetic remanence of said core, the improvement wherein said first winding is wound as a solenoid completely around said toroidal core in non-interlinking fashion, thereby providing manufacturing simplicity and effective electrical operation.

5. In a magnetic device comprising a magnetic circuit of material which is capable of assuming stable states of magnetic remanence, a first winding coupled to said magnetic circuit, first signal means connected to said first winding for delivering WRITE D.C. or A.C. signal pulses during the WRITING operation and a READ signal during the READING operation respectively, a second winding coupled to said circuit in such manner as to substantially neutralize mutual coupling with said first winding, second signal means connected to said second winding for delivering a unidirectional WRITE signal during the WRITING operation, said second winding developing an output signal by magnetic induction during the READING operation, the improvement wherein said first winding comprises a number of turns wound in solenoid form completely surrounding said material in non-interlinking fashion, thereby providing manufacturing simplicity and effective electrical operation.

References Cited by the Examiner

UNITED STATES PATENTS

| 2,810,901 | 10/57 | Crane | 340—174 |
| 2,902,676 | 9/59 | Brown | 340—174 |
| 2,939,117 | 5/60 | Brown | 340—174 |
| 2,944,249 | 7/60 | Kuntzleman | 340—174 |
| 2,974,308 | 3/61 | Van Tangerloo | 340—174 |
| 3,004,243 | 10/61 | Rossing | 340—174 |

FOREIGN PATENTS 766,037 1/57 Great Britain.

IRVING L. SRAGOW, *Primary Examiner.*

EVERETT R. REYNOLDS, *Examiner.*